United States Patent Office 3,561,261
Patented Feb. 9, 1971

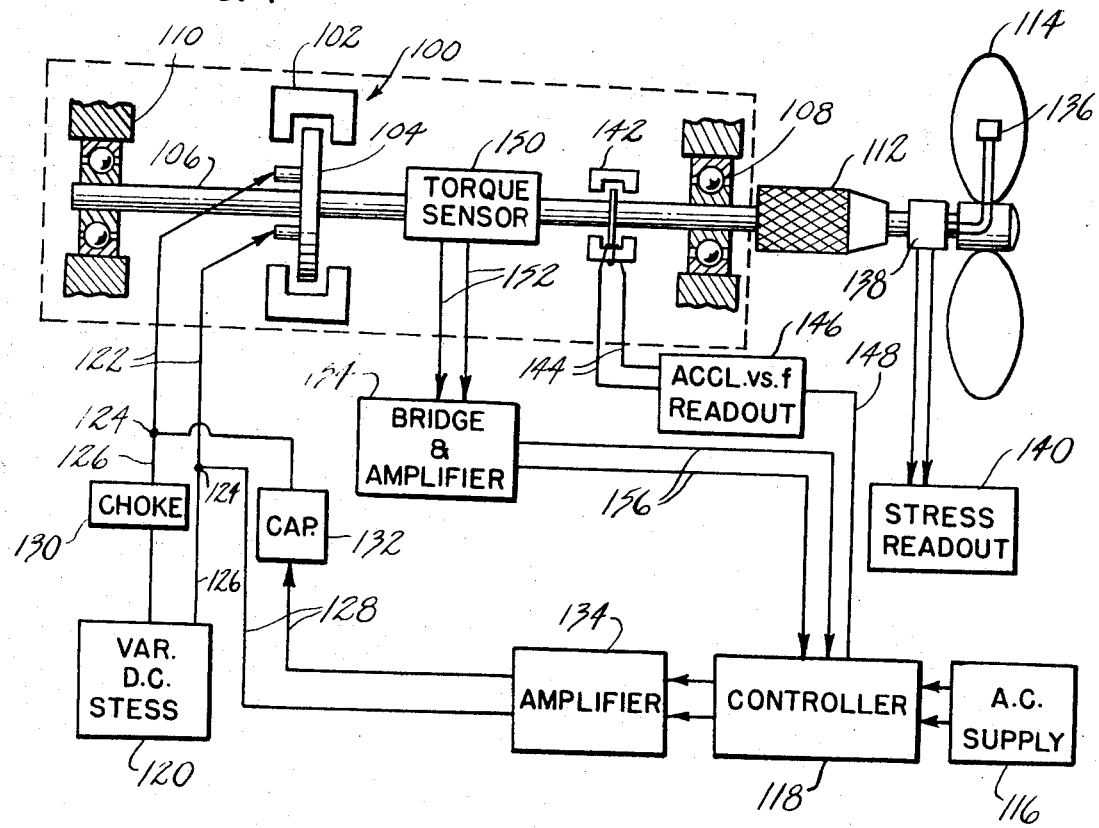

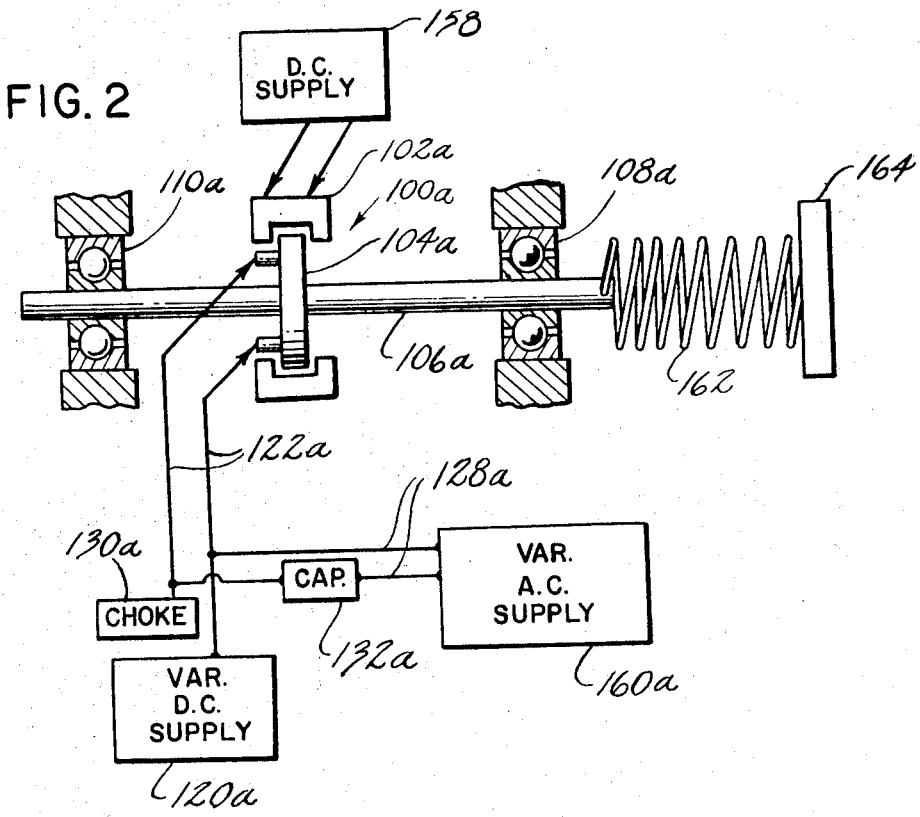
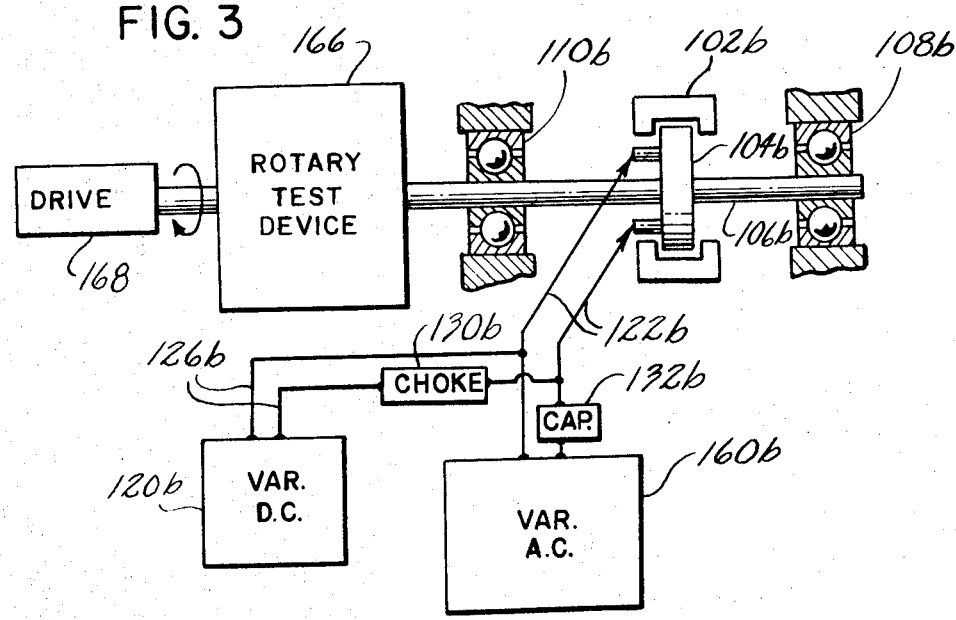

3,561,261
TORSIONAL EXCITER APPARATUS
Jay P. Conniff, Lynchburg, Va., and William F. Walker, Dundee, Ill., assignors to Torin Corporation, Torrington, Conn., a corporation of Connecticut
Application July 16, 1968, Ser. No. 745,297, now Patent No. 3,495,447, which is a continuation-in-part of application Ser. No. 601,925, Dec. 15, 1966. Divided and this application June 30, 1969, Ser. No. 844,723
Int. Cl. G01n 3/22, 3/26
U.S. Cl. 73—99
18 Claims

ABSTRACT OF THE DISCLOSURE

Torsional exciter apparatus comprising a DC motor with relatively fixed magnetic fields one of which is connected with an AC supply adjustable as to frequency and amplitude for providing torque pulsations of selected frequency and amplitude. The apparatus is usable as both a stationary and a rotary torsional shaker, as a preloading and torsional shaking device, and as an absorption dynamometer which transmits torsional pulsations to a driving device under test.

CROSS REFERENCES TO RELATED APPLICATIONS

The application is a division of our U.S. application Ser. No. 745,297, filed July 16, 1968, and now Pat. No. 3,495,447, "Apparatus For Fatigue Testing and Other Purposes and Method of Using Same," application 745,297 in turn being a continuation-in-part of our U.S. application Ser. No. 601,925, filed Dec. 15, 1966, and now abandoned, entitled "Apparatus for Fatigue Testing a Rotary Device and Method of Using Same."

BACKGROUND OF THE INVENTION

With regard particularly to fatigue or other testing involving a test device subjected to torsional pulsations, exciter apparatus has been available for concurrently rotating and imposing torsional pulsations, an illustrative example being disclosed in U.S. patent to Dudley, Ser. No. 2,384,987 entitled "Electric Vibration Generator." Such apparatus has not, however, been wholly satisfactory. As illustrated by the Dudley patent, fatigue testing with particular emphasis on torsionally induced vibrations can be conducted under simulated operating conditions but operating environment is not precisely duplicated and neither is the disadvantage of excessive time expenditure overcome. Further, it is not possible with apparatus of the Dudley type to duplicate precisely a desired program or waveform of torsional oscillation. More particularly, torsional oscillations can be induced with the Dudley apparatus but the oscillation waveform is neither variable and controllable over a wide range of frequency, amplitude and configuration, nor is the waveform a faithful reproduction of the electrical input waveform supplied to the apparatus. Instead, the output or oscillation waveform is limited as to controllability and versatility and is subject to extraneous effects and distortion. For example, an oscillation waveform in Dudley apparatus cannot be rendered independent of the speed of rotation of a test device and is thus subject to variation and distortion as a function of rotational speed when compared with the electrical input waveform.

SUMMARY OF THE INVENTION

A further and a most important object of the present invention resides in the provision of improved torsional exciter apparatus which has general utility as both a rotary and stationary torsional shaker, a preload and torsional shaker device, an absorption dynamometer, etc.

A still further and a more specific object of the invention resides in the provision of a highly versatile torsional exciter apparatus which is capable of reproducing electrical inputs representing a wide range of desired torsional excitation waveforms with a higher degree of fidelity than has heretofore been possible and with full independence from rotational speed and other extraneous factors.

In fulfillment of the aforestated objects, the improved torsional exciter apparatus is so designed and constructed as to be readily adapted for use as both a rotary and stationary torsional shaker, a means for concurrently preloading and torsionally exciting or shaking a test device, and as an absorption dynamometer adapted to subject a driving test device to torsional oscillations. Preferably, and as will be explained more fully hereinbelow, the exciter apparatus comprises a DC electrical motor with commutation means for maintaining stator and armature fields in fixed relationship with respect to each other and with a variable current power source adjustable as to frequency and amplitude. The variable current source, in preferred form, comprises an adjustable AC source connected with the armature of the DC motor and operable to provide desired torque pulsations. When the exciter apparatus is employed as a stationary torsional shaker, the motor armature and shaft may be connected to a test device in any angular relationship or rotative position of the armature. Due to the aforesaid field fixing means, the torque pulsation waveform is a faithful reproduction of the electrical input waveform and is readily and independently adjustable at the AC source as to frequency and amplitude. No distortion occurs in the waveform and no extraneous factors are introduced as a function of relative stator and armature rotative position or other factors. Thus, the apparatus exhibits a distinct advantage over presently available stationary torsional shakers in the elimination of a fixed starting or reference point. Further and for like reasons, the available range of torsional oscillation with the exciter apparatus of the invention is substantially greater than that of conventional shakers. With the elimination of effect on output waveform of relative field and stator and armature position, the extent or angle of oscillation of a test device is restricted only by limitations on available electrical input waveforms.

When employed as a rotary torsional shaker the DC motor is provided with a DC source which may also be connected with the armature and which serves to rotatively drive the test device. Again, as a result of the aforesaid field fixing means, relative rotation of motor fields and field generating elements is rendered ineffective with regard to the relationship between an electrical input waveform and the torsional pulsation or output waveform. Thus, rotational speed may be independently varied as well as the frequency and amplitude of the torsional pulsation output. Waveform reproduction is fully controllable, and exhibits a high degree of fidelity.

When the torsional exciter apparatus is employed for combined preloading and torsional shaking, a DC source is provided as mentioned above and a test device is secured against rotation or limited as to degree of rotation. The DC source may thus serve to apply a uniform and continuous torsional preloading at the test device while the effect of the AC source is to provide a desired torsional oscillation or pulsation.

With an independently rotatively driven test device, the exciter apparatus may be connected at its armature so as to serve as an absorption dynamometer with the AC source serving to impart torsional oscillations or pulsations to the driving test device. Here again, relative rotation of motor field generating elements is ineffective with respect to the frequency and amplitude of torsional oscillations or pulsations.

BRIEF DESCRIPTION OF THE DRAWINGS

FIG. 1 is a schematic illustration of improved torsional exciter apparatus adapted for use as a rotary torsional shaker.

FIG. 2 is a schematic illustration of the torsional exciter apparatus adapted for use as a stationary torsional shaker and/or a preloading and shaking device.

FIG. 3 is a schematic illustration of the torsional exciter apparatus adapted for use as an absorption dynamometer.

DESCRIPTION OF PREFERRED EMBODIMENTS

A most important characteristic of the improved torsional exciter apparatus of the invention is the provision of a fixed or stationary relationship of cooperating electromagnetic fields in the exciter. Thus, changes in relative angular or rotative position of exciter field generating elements such as a DC motor stator and armature are rendered ineffective with respect to the characteristics of torque pulsations provided by the exciter. Similarly, relative rotation of exciter field generating elements has no effect on the frequency or amplitude of output torque pulsations or the pulsation waveform and it is thus possible to reproduce faithfully an electrical input signal of independently controllable and precise configuration or waveform.

Various exciter constructions exhibit the foregoing characteristic and fall within the scope of the invention. In one such construction, one field generating element may be rotated physically in order to follow precisely and thereby to remain in fixed relationship with a rotating field of a second field generating element. Obviously, however, electrical field rotation presents a more practical approach particularly when the apparatus is employed as a rotary shaker, and such constructions are contemplated in a broader sense than that illustrated by the DC motor exciter. For example, a polyphase AC motor may be employed with the armature rotated at test device rotational speed by an independent rotary device and supplied with AC current through slip rings for inducing torque pulsations at the test device, the stator field being rotated electrically at precisely the armature speed by a polyphase generator also driven at armature rotational speed.

The DC motor employed as an exciter in the presently preferred apparatus may be of a type with an electromagnetically generated stator field as illustrated schematically in FIG. 2 thus provided for independent stator and armature excitation. In the preferred form, however, a motor having a permanent magnet stator and a printed circuit armature is employed. In either case the DC motor exhibits the aforesaid relatively fixed field characteristic and includes means providing for such fixed relationship of stator and armature fields despite changing relative rotative position or relative rotation of such field generating elements. Thus, in the permanent magnet-printed circuit DC motor, commutation means provides the desired characteristic and more particularly, a commutator constructoin having a large number of poles is provided. A large number of separate current conducting loops is provided [one hundred twenty-eight (128)] in the armature of the motor shown with the result that stator and armature fields are electrically maintained in fixed relative position. It is to be noted further that the printed circuit armature provides an additional advantage in that its relatively low inertia results in a minimum effect on the vibration response characteristics of a device under test. Still further, it is to be noted that a motor armature having nearly a pure resistive characteristic is desirable for maintaining impedance constant as frequency varies.

Referring now particularly to FIG. 1, it will be observed that an exciter is shown in the form of a DC motor indicated generally at 100. The motor is of the aforesaid permanent magnet stator-printed circuit armature type with commutation as described, the said stator and armature elements being identified respectively at 102 and 104. An exciter element is connected with one of the first and second field generating elements comprising the stator and armature and is connectible further with a test device. As shown, the excited element takes the form of an elongated motor shaft 106 which mounts the armature 104 and which is supported respectively by front and rear bearing means. The bearing means support the shaft 106 at least for limited rotation and, as shown in FIG. 1, said means comprise conventional ball bearing units 108, 110 which journal the shaft 106 for full rotation. Forwardly of the front bearing unit 108, a chuck 112 provides for detachable connection of a rotary test device, shown as an axial fan 114.

In accordance with a broad aspect of the invention, the torsional exciter apparatus also comprises a variable current power source adjustable as to frequency and amplitude and which is connected to at least one of the electro-magnetic field generating elements comprising the exciter stator and armature. The variable current power source may vary widely and may comprise even a source such as a "PULSER" adapted to vary current and control frequency and amplitude and to provide one or more current pulses as would be appropriate for torsional shock testing of a device. It is anticipated, however, that the apparatus will find more extensive utility in vibration testing and a periodically fluctuating source which may comprise sinusoidal, sawtooth, triangular, random, etc. waveforms is preferred. As shown in FIG. 1 a variable frequency and amplitude conventional AC source is provided, AC supply 116 entering controller 118 which provides for frequency and amplitude adjustment.

In FIG. 1 a means for independently rotating one field generating element of the exciter for rotary torsional shaker use comprises a variable DC source 120 connected in common with the AC source 116, 118 through suitable slip rings with the armature 104; it being understood, however, that alternative AC and DC connections to field generating elements fall within the scope of the invention. Common supply lines 122, 122 from the armature 104 extend to junctions 124, 124 with DC and AC lines 126, 126 and 128, 128 respectively. Choke 130 and capacitance 132 respectively block AC and DC in the lines 126, 128 and the AC lines 128, 128 extend to an amplifier 134 and thence to the aforementioned controller 118.

From the foregoing it will be apparent that the exciter 100 can be operated concurrently to rotate and to impart torsional pulsations to the fan 114. Adjustment of the DC supply 120 may be effected independently to vary rotational speed as desired and fully independent control of torsional pulsations may be effected by AC frequency and/or amplitude adjustment at the controller 118.

Accelerated fatigue testing in the nature of that described in patent application Ser. No. 745,297 but under simulated rather than actual conditions can be carried out with the torsional exciter apparatus of FIG. 1. Thus, the fan 114 may be provided with stress indicating means in the form of strain gage 136, slip rings 138, and stress readout instrumentation at 140.

FIG. 1 also illustrates elements adapting the exciter apparatus for advantageous use in determining natural frequency of rotary test devices and for various other purposes. An angular accelerometer is provided at 142 on the exciter element or motor shaft 106 and has lines 144, 144 which extend to readout instrumentation at 146. A line 148 from the controller 118 also connects with the readout 146 and supplies a frequency signal thereto. The accelerometer is operable with the shaft 106 rotating to provide an acceleration signal to the readout 146 and may comprise a Hoodwin Model 220A Angular Accelerometer. Thus, an acceleration versus frequency readout is provided and may be conveniently indicated by a conventional chart recorder for ready determination of the natural frequency of rotary test devices such as fan 114.

Preferably, feed back means is also provided in the apparatus to compare a signal of actual torque pulsations with an input torsional pulsation signal whereby accurately to maintain actual pulsations at preset levels. Such means may of course vary widely but is shown in the form of a torque sensor 150 mounted on the motor shaft 106, and responsive to actual torque pulsations, lines 152, 152 extending from the sensor 150, a bridge and amplifier unit 154 receiving the sensor signal from the lines 152, 152 and lines 156, 156 from the unit 154 to the controller 118. The torque sensor 150 is of the strain gage, slip ring type and a Model 1104S–500 unit manufactured by Lebow Instruments is presently employed. The bridge-amplifier 154 presently employed is manufactured by Ellis Associates and is identified as a BAM–1 unit. The controller 118 is of a type conventionally used with axial and stationary torsional shakers and includes circuitry for comparing an actual excitation or pulsation signal from a sensor such as 150 with an input signal and modifying the latter to maintain the former at preset levels. The controller employed may be identified as a Model 1018 Exciter Controller manufactured by B & K Instruments Inc.

In FIG. 2 the torsional exciter apparatus is shown adapted for stationary torsional shaker use and for use as a preloading and shaking device, like elements being identified with like reference numerals with the suffix a (re FIG. 1). DC motor 100a may be of the shunt-connected type with a separate DC supply 158 for the stator 102a and with an armature connected DC supply 120a provided for rotating or tending to rotate the shaft 106a. A variable frequency and amplitude AC supply 160a also supplies the armature 104a for inducing torque pulsations in a test device and the motor includes means such as commutators for relatively fixing the stator and armature fields as mentioned above. Additional control, feedback, readout elements, etc. may of course be provided as in FIG. 1.

It will be apparent that the apparatus of FIG. 2 can be operated as a stationary torsional shaker with the DC supply 120a in an off condition and ineffective to rotate the motor armature 104a. Thus, a test device such as a coil spring 162 may be connected at one end portion with the motor shaft 106a and excited torsionally thereby, the AC source 160 being adjusted for desired frequency and amplitude of torque pulsations. A mounting pad or block 164 secures an opposite end portion of the spring 162.

In operation as a stationary shaker the FIG. 2 apparatus exhibits distinct advantages over presently available shakers. Thus, a starting or reference point for imposing torsional pulsations may be selected at random for test device mounting convenience or other considerations. That is, there is no limitation to a fixed reference point and the shaft 106a may be turned through 360° to any desired rotative position for convenient attachment of a test device. Due to the mechanical independence of stator and armature and the relatively fixed field characteristic of the exciter, relative stator and armature position has no effect on the frequency, amplitude etc. of the output torque pulsations and a fixed and independently controllable input current-output pulsation relationship is maintained. For added convenience the mount 164 may be adapted for rotatable adjustment.

Further, the fixed field and mechanically independent stator and armature characteristics enable the exciter to provide wide angle torsional oscillation to a degree heretofore unobtainable. In conventional stationary torsional shakers the angle of oscillation is severely limited by mechanical means and by the characteristics of magnetic fields encountered. In the absence of the relative field fixing characteristics of the present exciter, there is undesired distortion of the output pulsation waveform with respect to the input current waveform when wide angle oscillation is attempted with such conventional shakers.

In use as a preloading and torsional shaking apparatus, the FIG. 2 elements may be operated as described above but with the DC source operative. That is, the DC source may be adjusted to a desired value to cause stator and armature field interaction tending to rotate a test device such as the spring 162. Torsional preloading of the device to a desired degree will result with the device restrained by the mount 164 and AC current supplied to the armature 104a will provide the desired torsional pulsations for various types of testing under preload.

In FIG. 3 the exciter apparatus is shown adapted for absorption dynamometer use with elements corresponding to FIGS. 1 and 2 elements identified with like reference numerals but with the suffix b. Means for rotating or oscillating the shaft 106b and armature 104b independently of the AC source 160b takes the form of a mechanically connected rotary test device 166 which may be self operated or externally rotatively or oscillably driven as indicated at 168. Variable DC supply or load 120b may be employed either to assist or oppose the rotative driving force of the test device and AC source 160b may be employed as above to impart desired torsional pulsations to the test device. Various additional elements not shown but which are conventional in absorption dynamometer testing may of course be provided.

We claim:

1. Torsional exciter apparatus comprising an exciter element connectible with and adapted to transmit torque pulsations to a test device, bearing means supporting said element at least for limited rotation, a first magnetic field generating element connected with said exciter element, a second magnetic field generating element arranged for cooperation of its field with the field of said first field generating element, means for maintaining said two fields in fixed relationship with respect to each other, a variable current power source including frequency and amplitude adjusting means, and means connecting said power source with one of said first and second field generating elements to vary its field strength and to thereby induce torque pulsations in said exciter element of selected frequency and amplitude independently of the relative position of said field generating elements.

2. Torsional exciter apparatus as set forth in claim 1 wherein said field generating elements comprise the armature and stator elements of a DC motor, and wherein said exciter element comprises the motor shaft.

3. Torsional exciter apparatus as set forth in claim 2 wherein said DC motor includes an armature having a substantially pure resistive characteristic.

4. Torsional exciter apparatus as set forth in claim 2 wherein said DC motor includes provisions for independent excitation of said stator and armature elements.

5. Torsional exciter apparatus as set forth in claim 2 wherein said DC motor has a printed circuit armature.

6. Torsional exciter apparatus as set forth in claim 5 wherein said DC motor has a permanent magnet stator, and wherein said variable current power source is connected with the armature.

7. Torsional exciter apparatus as set forth in claim 1 wherein a means is provided in operative association with one of said field generating elements and tends to rotate the same independently of said variable current power source.

8. Torsional exciter apparatus as set forth in claim 7 wherein said means tending to rotate said one element comprises a DC power source connected with one of said field generating elements.

9. Torsional exciter apparatus as set forth in claim 8 wherein said variable current power source and said DC power source are connected in common with said first magnetic field generating element.

10. Torsional exciter apparatus as set forth in claim 9 wherein said variable current power source comprises a variable frequency and variable amplitude AC source providing for independent selection of frequency and amplitude of torque pulsations.

11. Torsional exciter apparatus as set forth in claim 7 wherein said means tending to rotate said one element comprises a device mechanically connected in driving relationship with said exciter element and tending to rotate the same together with said connected first magnetic field generating element.

12. Torsional exciter apparatus as set forth in claim 11 wherein said device comprises a rotary test device which is driven rotatively from an independent source and which is subjected to torque pulsations from said exciter element while rotatively driving the same.

13. Torsional exciter apparatus as set forth in claim 8 wherein a means is provided for rotatively restraining a test device connected with said exciter element, said device thus being subjected to angular preloading by the tendency of said DC power to rotate said exciter element, and being subjected further to torque pulsations by independent variation in the field strength of said one field generating element under the control of said variable current power source.

14. Torsional exciter apparatus as set forth in claim 1 wherein said first and second field generating elements are at least partially relatively rotatable and are mechanically independent so as to accommodate connection of a test device to said exciter element over a wide range of selected angular relationships of said elements, said field fixing means providing for a fixed variable input current-torque pulsation relationship irrespective of selected angular relationship.

15. Torsional exciter apparatus as set forth in claim 14 and including a means supporting a test device for wide angular oscillation with said field relationship fixing means serving to provide for a fixed relationship of input current to torque pulsation independently of such wide angle oscillation.

16. Torsional exciter apparatus as set forth in claim 1 wherein said variable current power source comprises a periodically fluctuating current source, and wherein a second power source is provided and comprises a DC supply connected with one of said field generating elements to rotate said exciter element for concurrent torsional excitation and rotation of a test device.

17. Torsional exciter apparatus as set forth in claim 16 wherein said DC source is variable for adjustment of the speed of rotation of the test device.

18. Torsional exciter apparatus as set forth in claim 16 wherein feed back means is provided from said exciter element and test device to provide a signal of actual torsional excitation, wherein a controller is provided and connected to receive said signal, wherein said controller is also connected with said adjustable frequency source so as to receive an input torsional excitation signal, and wherein said controller operates automatically to modify and transmit said input signal whereby to maintain actual excitation at preset levels.

References Cited
UNITED STATES PATENTS

| | | | |
|---|---|---|---|
| 2,384,987 | 9/1945 | Dudley | 73—71.5 |
| 3,292,425 | 12/1966 | Conn | 73—67 |
| 3,302,084 | 1/1967 | Bolton | 318—166 |
| 3,394,295 | 7/1968 | Cory | 318—115 |

RICHARD C. QUEISSER, Primary Examiner

J. WHALEN, Assistant Examiner

U.S. Cl. X.R.

73—70.1, 71.5; 318—35, 166